Dec. 29, 1959 H. E. RUPP II 2,919,139
LOW SLUNG VEHICLE FRAME
Filed May 20, 1959

INVENTOR.
HERBERT E. RUPP, II
BY
WATTS & EDGERTON
ATTORNEYS

United States Patent Office 2,919,139
Patented Dec. 29, 1959

2,919,139

LOW SLUNG VEHICLE FRAME

Herbert E. Rupp II, Mansfield, Ohio

Application May 20, 1959, Serial No. 814,461

6 Claims. (Cl. 280—106)

This invention relates broadly to automotive vehicles and more specifically to the chassis construction thereof.

The vehicle frame embodying the present invention is illustrated in an automobile midget racing car, but it is to be understood that the invention is not limited to such use.

One of the objects of the invention is to provide a chassis frame which is constructed primarily from tubing organized from the fewest number of parts to provide maximum strength and rigidity, and designed to accommodate assembly of the parts with ease, economy and dispatch.

Other objects of the invention reside in the provision of a chassis frame which is light in weight, designed to facilitate ready accessibility to the parts thereof for the purpose of alteration and repair, and further designed with a low center of gravity to assure the stability of the vehicle when negotiating sharp curves in a road, race track or similar driving course.

Further objects of the invention reside in the provision of a chassis frame which is simple of structure, economic of manufacture and assembly, and a frame which is efficient of operation under the strains imposed thereon when driven at high speed on a race course.

Other objects and advantages more or less ancillary to the foregoing, and the manner in which all the various objects are realized, will appear in the following description, which considered in connection with the accompanying drawings, sets forth the preferred embodiment of the invention.

Referring to the drawings.

Figure 1:
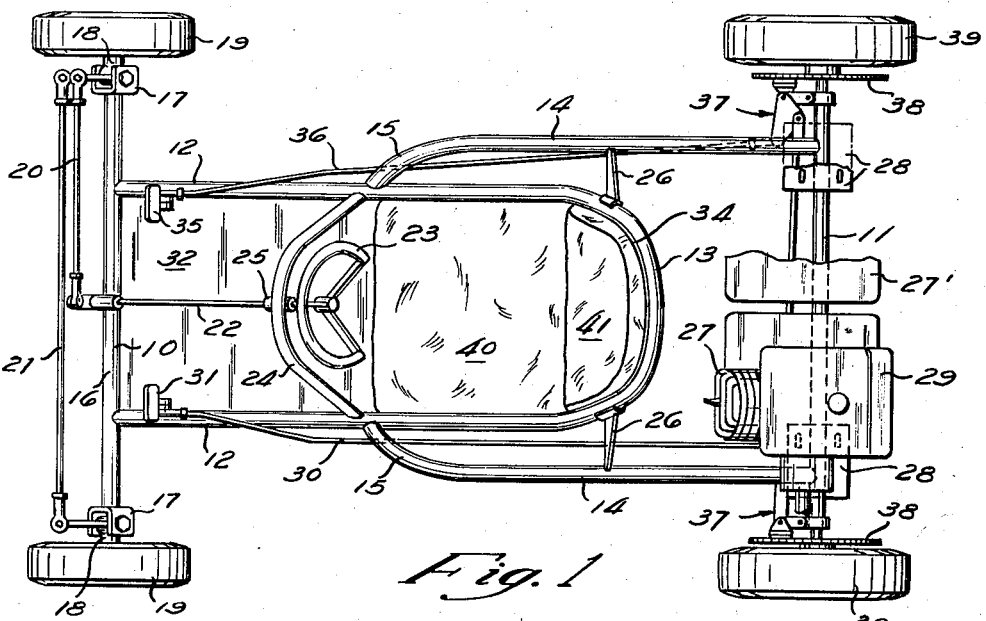
Fig. 1 is a plan view of an automotive vehicle.
Figure 2:
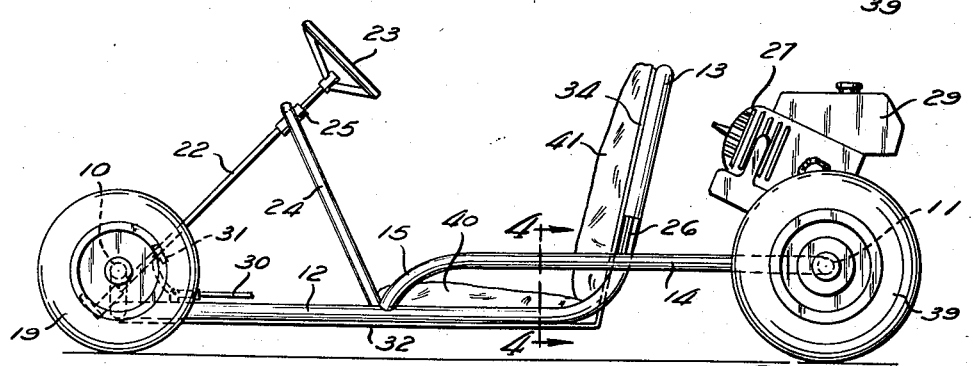
Fig. 2 is a side elevational view thereof.
Figure 3:
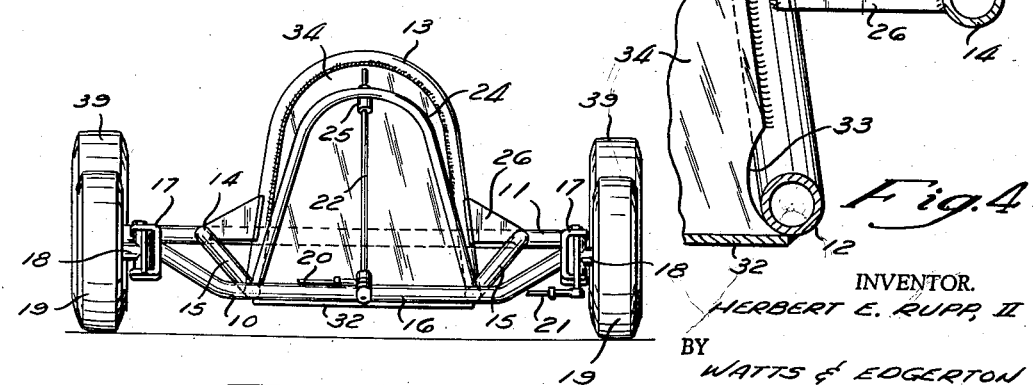
Fig. 3 is a front elevational view of the vehicle.
Figure 4:
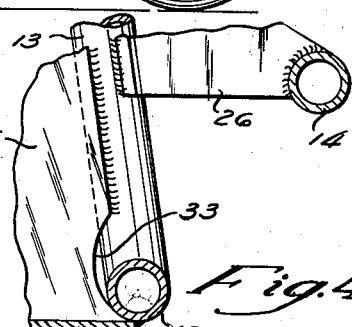
Fig. 4 is a vertical sectional view of a fragmentary portion of the chassis frame, the section being taken on a plane indicated by the line 4—4 in Fig. 2.

Referring first to Fig. 1, the vehicle comprises a tubular chassis construction embodying a stationary front axle 10, a rear stationary axle 11, and a frame including a forward U shaped member having the parallel rails 12 welded at their ends to the front axle. The U shaped member is formed with a looped rearward end portion 13 disposed upwardly and inclined rearwardly, which constitutes a back rest frame for the driver. The frame member is provided with secondary vertically spaced substantially parallel side arms 14 having the rearward ends thereof welded to a rear axle housing 11 and depending forward end portion 15 welded to the rails 12 and spaced laterally from the rails 12. The side portions form rails for the driver's hands and are elevated from the ground to avoid injury. The front axle is formed with a depressed central portion 16 with yoked brackets 17 welded on each end thereof which receive steering knuckles and wheel spindles 18. The front wheels 19, having pneumatic tires thereon, are mounted on the spindles 18 of the steering knuckles, which are pivotally connected to a drag link 20. The steering knuckles are pivotally interconnected by a tie rod 21. A steering column 22, in the medial axes of the chassis, is inclined upwardly and rearwardly, and is provided with a steering wheel 23 on the free end thereof. The steering column is supported by a U frame 24 welded at its lower ends to the frame members 12 and secured in the center of the looped portion to a sleeve 25 on the steering column 22. Secondary side arms 14, wider than the frame side rails 12, are connected to the back rest frame 13 by lateral brackets 26. An engine 27 is mounted on the rear axle 11 on pads 28 secured thereto and is preferably disposed in offset relation to the medial axis of the chassis frame so a second motor 27' partially shown, may be mounted thereon. The engine 27 shown herein, is of an air cooled type and has a fuel tank 29 on the top thereof and a throttle control rod 30 connected to an accelerator pedal 31 pivotally connected to the forward end of the frame member 12.

The lower faces of the frame side rails 12 have the marginal side edges of a floor plate 32 welded thereto. The floor plate is formed with opposed notches 33 therein which afford admission of the upwardly inclined side rails of the back rest frame member 13 and affixation of the upwardly bent portion 34 of the plate, as affixed to the forward face of the driver's back rest frame. The floor and back rest plate are of a unitary structure so the pressure of the body of the driver is borne by the forward face of the frame back rest rather than the supporting weld therefor.

The chassis frame further includes a brake pedal 35, push rod 36 and equalizing mechanism 37 for brake shoes engaged with brake discs 38 mounted on the rear wheels 39 of the vehicle. Since the latter mechanism forms, per se, no part of the present invention and is described in my copending application Serial No. 814,482 filed simultaneously herewith, further description thereof is deemed unnecessary herein.

The floor board 32 and back rest 34 are provided respectively, with a padded seat 40 and a cushion back rest 41.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A vehicular chassis comprising front and rear axles, a U-shaped front frame member including substantially horizontal and parallel side rails and an upwardly and rearwardly inclined loop constituting a driver's back rest, the front ends of said side rails being fixed to said front axle, substantially parallel side arms affixed at their trailing ends to said rear axle and extending forwardly past said loop of the front frame member and being substantially parallel to, and spaced upwardly from, and connected to, said side rails between their front ends and said loop, and means connecting said side arms to said loop.

2. The combination of elements set forth in claim 1 including a back rest plate attached to said loop.

3. The combination of elements set forth in claim 1 including a plate attached to the side rails adjacent to said loop.

4. The combination of elements set forth in claim 1 including a plate attached to the side rails and to the loop and serving as a floor and a back rest.

5. A vehicular chassis comprising front and rear axles, a U-shaped front frame member including substantially horizontal and parallel side rails and an upwardly and rearwardly inclined loop constituting a driver's back rest, the front ends of said side rails being fixed to said front axle, substantially parallel side arms affixed at their trailing ends to said rear axle and extending forwardly past said loop of the front frame member, said side arms being spaced laterally outwardly from said loop and upwardly from said side rails and having leading ends extending downwardly and inwardly and being connected to said side rails between their leading ends and said loop, and brackets connecting said side arms to said loop.

6. The combination of elements set forth in claim 5 in which the said rear axle, frame member and side arms are metal tubes.

References Cited in the file of this patent
UNITED STATES PATENTS

| | | |
|---|---|---|
| 810,379 | Pope | Jan. 16, 1906 |
| 2,527,434 | Little et al. | Oct. 24, 1950 |

OTHER REFERENCES

American Bicyclist and Motorcyclist Magazine; October 1958; pages 59 and 60; the ad and article concerning "Go Karts."